(12) United States Patent
Nihouran

(10) Patent No.: US 6,182,175 B1
(45) Date of Patent: Jan. 30, 2001

(54) SERIAL DATA TRANSFER PROCESS, AND SYNCHRONOUS SERIAL BUS INTERFACE IMPLEMENTING SUCH PROCESS

(75) Inventor: Gilbert Nihouran, Guengat (FR)

(73) Assignee: Matra Nortel Communications (FR)

( * ) Notice: Under 35 U.S.C. 154(b), the term of this patent shall be extended for 0 days.

(21) Appl. No.: 09/249,147

(22) Filed: Feb. 12, 1999

(30) Foreign Application Priority Data

Feb. 16, 1998 (FR) .................................................. 98 01831

(51) Int. Cl.$^7$ .................................................. G07F 13/00
(52) U.S. Cl. .................... 710/105; 710/129; 710/130; 710/61; 710/105; 709/230
(58) Field of Search .......................... 709/230; 710/100, 710/105, 61, 129, 130

(56) References Cited

U.S. PATENT DOCUMENTS

| | | | |
|---|---|---|---|
| 4,683,530 | 7/1987 | Quatse | 340/825.05 |
| 5,434,862 | 7/1995 | Lokhoff | 370/85.11 |
| 5,671,421 | * 9/1997 | Kardach et al. | 710/260 |
| 5,758,073 | * 5/1998 | Liang et al. | 709/230 |
| 5,928,345 | * 7/1999 | Tetzlaff et al. | 710/107 |

FOREIGN PATENT DOCUMENTS

| | | | |
|---|---|---|---|
| 0 051 332 B1 | 5/1982 | (EP) | G06F/3/04 |
| 0 159 941 A2 | 10/1985 | (EP) | G06F/13/42 |
| 0 498 494 A1 | 8/1992 | (EP) | H94L/12/26 |

OTHER PUBLICATIONS

French Search Report dated Nov. 27, 1998.

* cited by examiner

Primary Examiner—Xuan M. Thai
(74) Attorney, Agent, or Firm—George T. Marcou; Kilpatrick Stockton LLP

(57) ABSTRACT

The synchronous serial bus between a main processing unit and a peripheral unit includes a data line and a clock line. Strobe pulses presented by the main processing unit on the data line while it holds the clock line at a given logic level characterise transfer cycles on the bus. The main processing unit can thus run write or read cycles in registers of an interface of the peripheral unit. A direct transfer mode, wherein the strobe pulse is transmitted at the beginning of the cycle without specifying an address, is provided to enable the main processing unit to have a fast access to certain locations previously specified. The data and clock lines of the bus may be shared with those of another synchronous bus.

27 Claims, 8 Drawing Sheets

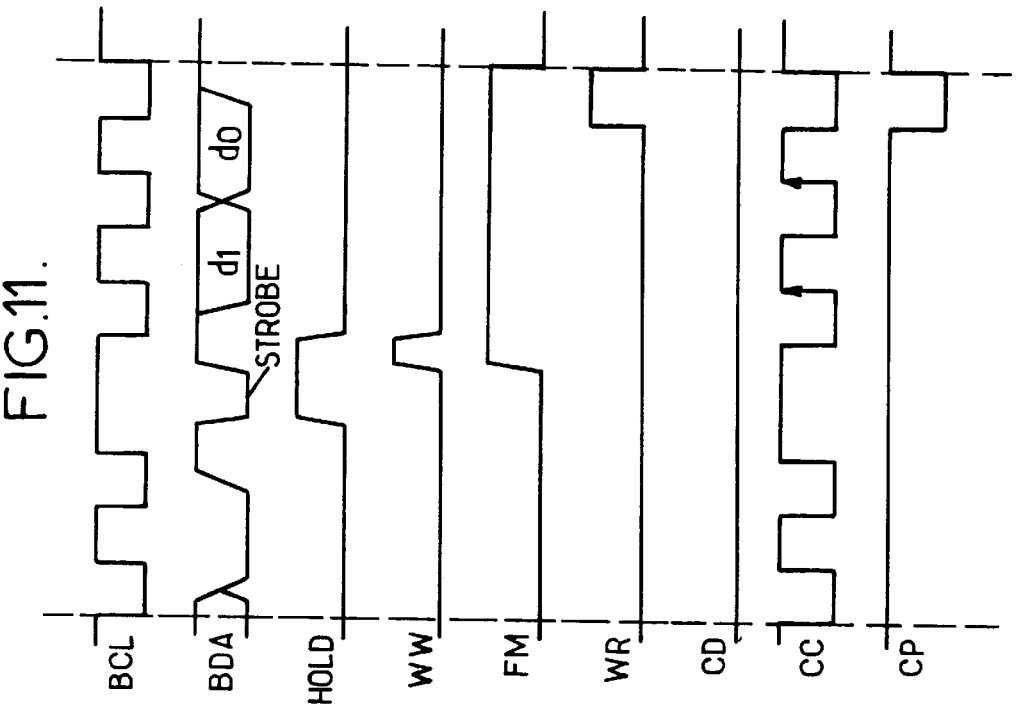
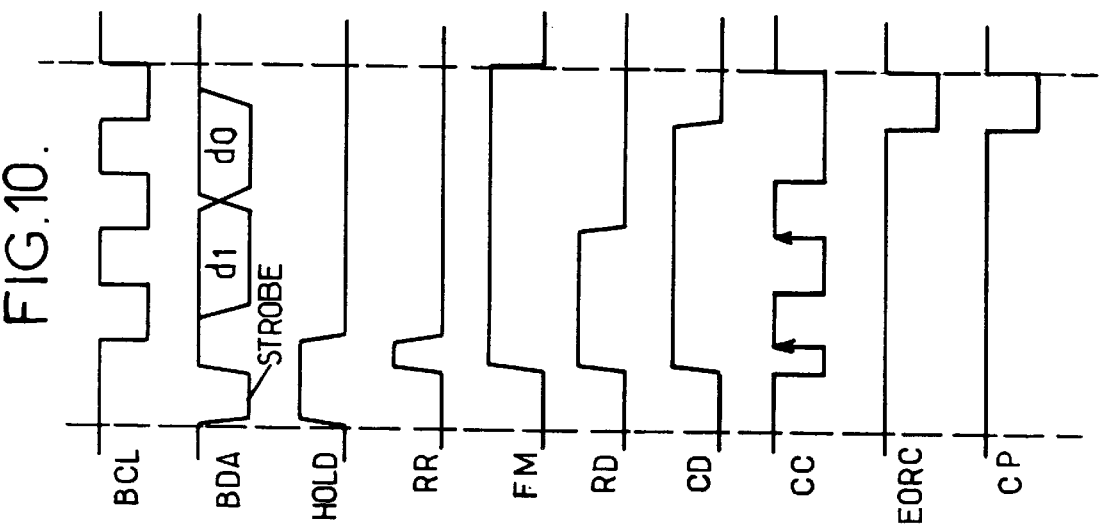

SERIAL DATA TRANSFER PROCESS, AND SYNCHRONOUS SERIAL BUS INTERFACE IMPLEMENTING SUCH PROCESS

BACKGROUND OF THE INVENTION

The present invention relates to the area of serial digital data transmissions. It relates more particularly to a synchronous bus and its master/slave transmission protocol between a main processing unit (master) and a peripheral unit (slave).

An example of such a bus, used in different categories of equipment, is the so-called I²C bus described in European patent 0 051 332. A certain number of clock cycles are required for the microprocessor or microcontroller constituting the main processing unit to retrieve one byte of data (58 clock cycles in the case of the circuit marketed by the PHILIPS company with the reference number PCD 3316 which employs such a bus).

An object of the present invention is to propose a new synchronous serial bus protocol enabling faster access to certain data in the peripheral unit.

SUMMARY OF THE INVENTION

The invention thus proposes a process for serial data transfer between a main processing unit and a peripheral unit connected to each other by a bus including a data line and a clock line, wherein the main processing unit controls synchronised transfer cycles by means of the clock line, including transfer cycles with addressing and direct transfer cycles, wherein, during each cycle, the main processing unit transmits on the data line a strobe pulse while the clock line is at a first logic level, wherein, before transmitting the strobe pulse in a transfer cycle with addressing, the main processing unit transmits on the data line bits of a transfer address, with corresponding synchronisation pulses on the clock line, wherein, after receiving the strobe pulse in a transfer cycle with addressing, the peripheral unit accesses to a memory location determined from the transfer address to write or read data bits successively presented on the data line synchronously with corresponding synchronisation pulses on the clock line, and wherein, after receiving the strobe pulse in a direct transfer cycle, the peripheral unit accesses to a memory location determined prior to said direct transfer cycle to write or read data bits successively presented on the data line synchronously with corresponding synchronisation pulses on the clock line.

The transfer protocol is very simple, thus enabling fast access. It is based on the detection of the strobe pulse on the data line by the peripheral unit. The main processing unit distinguishes between the different transfer modes through the position of this strobe pulse during the cycle, and/or by means of selection bits provided on the data line before the strobe pulse and/or by a decoding of the address bits.

Very fast access to some storage locations in the peripheral unit is made possible by the direct transfer mode, given that the main processing unit provides no address bits in this mode, and that the desired data is previously selected.

The location where the transmitted data bits are obtained in direct transfer mode may be a predetermined fixed location, which enables the structure of the bus interface of the peripheral unit to be simplified to the maximum and therefore its cost to be minimised.

It may also be a location whose address is obtained from data supplied by the main processing unit during a previous write cycle. In this case, direct read cycles can be run by the main processing unit to read different types of data in the peripheral unit. The number of bits read in this way may also be a parameter set by the main processing unit during a previous write cycle.

The direct read mode may particularly be used in the fast handling of some interrupts by the main processing unit.

Another advantage of the proposed bus is that it may share its data line and its clock line with those of a bus operating in accordance with another protocol for the exchange of data between the main processing unit and other entities.

According to another aspect, the present invention proposes a synchronous serial bus interface for a peripheral unit controlled by a main processing unit by means of a bus including a data line and a clock line including:

strobe pulse detection means, to detect strobe pulses occurring on the data line of the bus, while the clock line of the bus is at a first logic level;

a first shift register timed by the clock line of the bus, having a serial data input connected to the data line;

a second shift register having a serial data input connected to the serial data output of the first shift register or to the data line, and timed by the output of an EXCLUSIVE OR gate having an input connected to the clock line of the bus, and another input receiving a binary selection signal;

an output switch connected on the one hand to the serial data output of the second shift register and on the other hand to the data line of the bus;

transfer cycle identification means, in order to analyse the content of the first shift register when a strobe pulse is detected so as to identify each transfer cycle to which a detected strobe pulse belongs;

write registers addressable from a write address obtained from the first shift register when a write cycle with addressing has been identified, a write cycle with addressing wherein the binary selection signal is held at 0, the output switch is kept open and the detection of the strobe pulse is followed by the parallel transfer of the content of the second shift register into the write register denoted by the write address;

read registers addressable from a read address when a read cycle has been identified, a read cycle wherein the detection of the strobe pulse is followed by the parallel transfer of at least part of the content of the read register denoted by the read address into the second shift register and by the serial transfer of the content of the second shift register to the output switch, a serial transfer during which the binary selection signal is set at 1 and the output switch is closed; and transfer cycle managing means to obtain the read address from the first shift register when a read cycle with addressing has been identified, and to supply a previously specified read address when a direct read cycle has been identified.

BRIEF DESCRIPTION OF THE DRAWINGS

FIGS. 8 to 11 are timing diagrams showing respectively a write cycle, a read cycle (direct or with addressing) and decoding of addresses in a direct transfer cycle.

DESCRIPTION OF PREFERRED EMBODIMENTS

Figure 1:
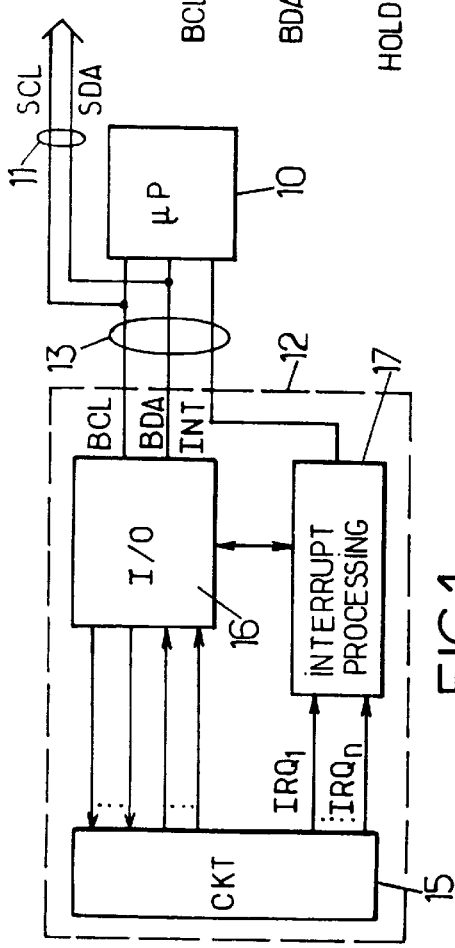
FIG. 1 is a block diagram of a device implementing the present invention.

FIG. 1 shows diagrammatically a device the general operation of which is controlled by a main processing unit constituted by a microprocessor 10. The microprocessor 10 controls a certain number of units (not shown) of the device by means of a serial bus 11 of known type, such as for example a I$^2$C bus comprising a data line SDA and a clock line SCL (see EP-B-0 051 332).

Another peripheral unit 12 is controlled by the microprocessor 10 by means of a serial bus 13 operating in accordance with the invention.

As an example of application, the device may be a telephone whose microprocessor 10 controls, by means of an I$^2$C bus 11, units such as a keyboard, a display screen and different interfaces, the unit 12 being a component dedicated to the observation of the telephone line and to the processing of certain data relative to sophisticated services offered by network operators.

In this kind of application, the cost of the components must be as low as possible, and it is particularly desirable to be able to reduce as far as possible the number of input/output pins in the microprocessor. To this end, the bus 13 serving as interchange between the units 10 and 12 borrows the data and clock lines of the general bus 11, which are also denoted BDA and BCL. The protocol which will be described below prevents ambiguities on these lines.

The bus 13 additionally comprises an interrupt line INT enabling the peripheral unit 12 to indicate certain events to the microprocessor 10 by sending an interrupt request.

The bus interface, provided between the operating circuits 15 of the peripheral unit 12 and the bus 13, includes an input/output module 16 and an interrupt processing module 17. The module 17 receives from the circuits 15 respective interrupt signals $IRQ_1$–$IRQ_n$ relative to a group of n events whose detection triggers the sending of an interrupt request on the INT line. The module 17 controls the storage, in a status register of the module 16, of n bits corresponding to the statuses of the signals $IRQ_1$–$IRQ_n$. In response to an interrupt request received on the INT line, the microprocessor 10 reads the status register to discover the origin of the interrupt and to determine which interrupt program should be run.

In the example of application to a telephone, the group of events associated with the interrupt signals $IRQ_1$–$IRQ_n$ includes for example the detection of ringing on the line, the detection of the presence of line voltage and the detection of various signals transmitted by the network on the telephone line in the context of particular services.

Figure 4:
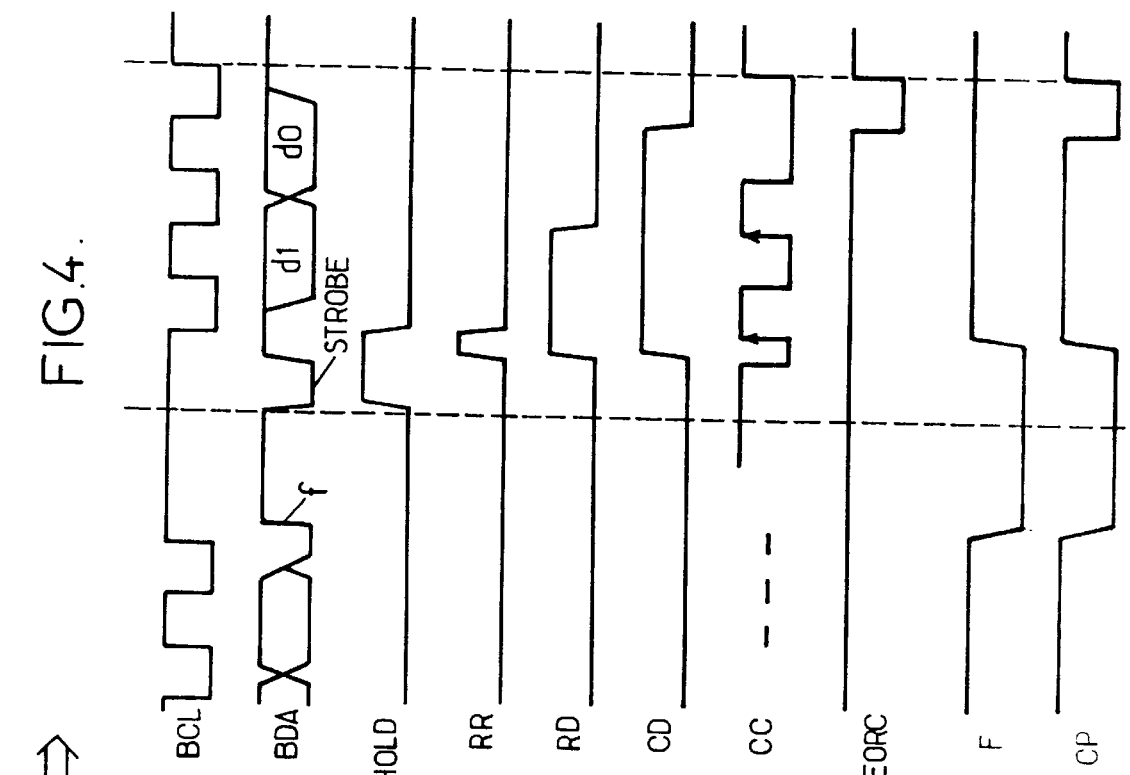
FIGS. 2 to 4 are timing diagrams showing respectively a write cycle, a read cycle with addressing and a direct read cycle run in an example of the process in accordance with the invention.
Figure 2:
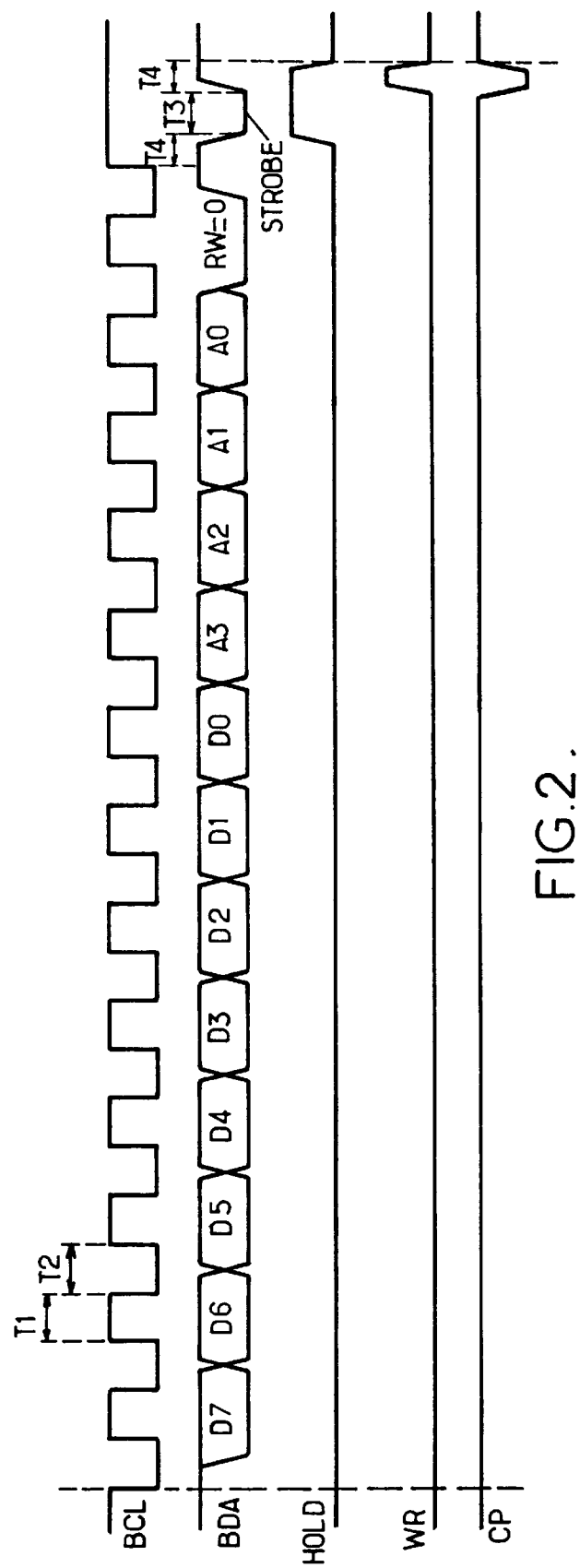
Figure 3:
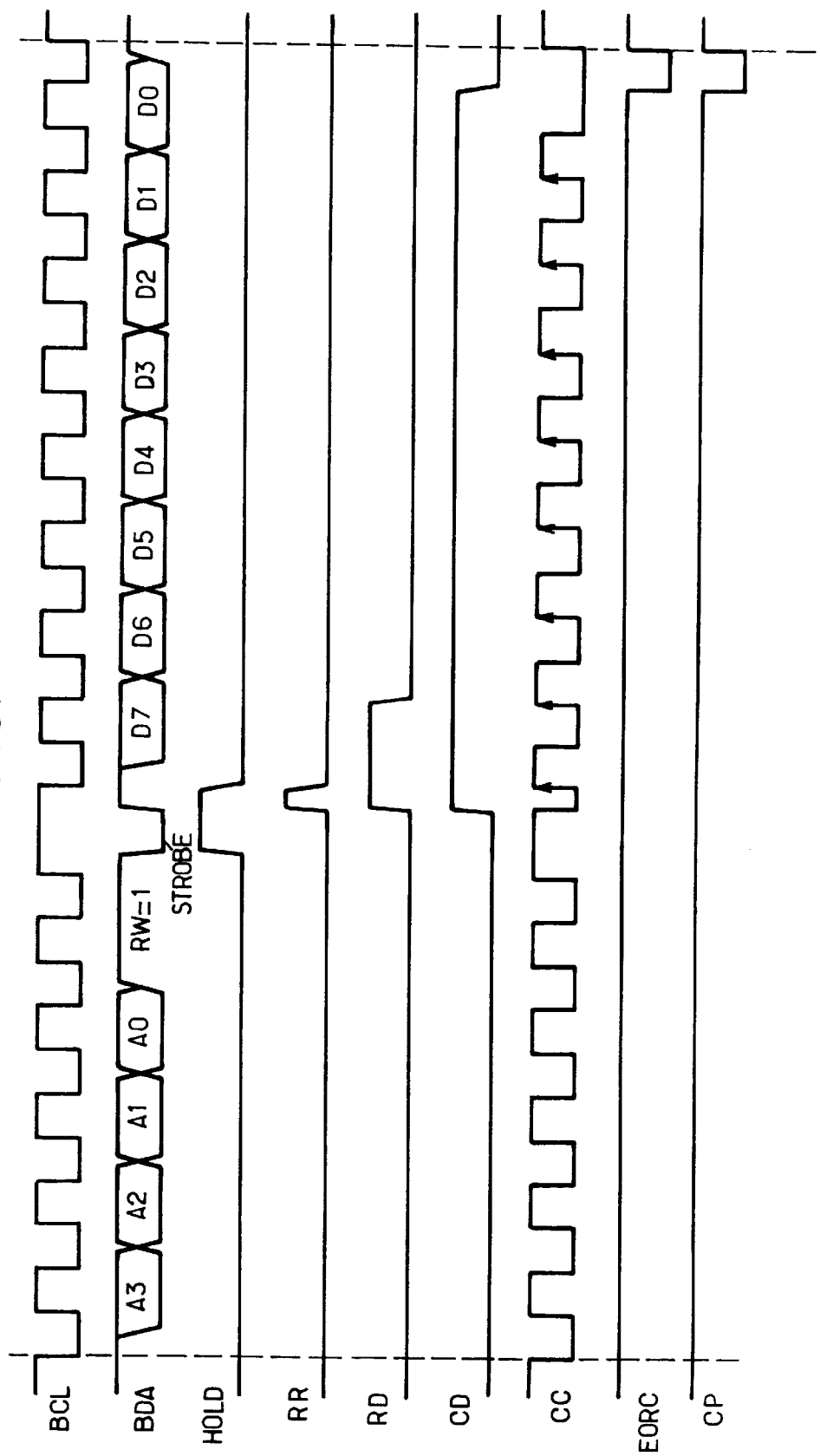

The first two lines in FIGS. 2 to 4 show how the microprocessor 10 controls the lines BCL, BDA of the bus 13 to trigger data transfers from or to the peripheral unit 12. In each case, the use of the bus 13 is signalled by a strobe pulse presented during a transfer cycle on the data line BDA while the clock line BCL is at a given logic level. In the example described, this logic level is level 1, and the strobe pulse is a logic level 0, i.e. starting with a falling edge and ending with a rising edge, these two edges occurring while BCL=1.

In a write cycle with addressing (FIG. 2), the strobe pulse is preceded by n+m+1 regular synchronisation pulses on the clock line BCL (n=8 and m=4 in the example shown), each pulse starting with a rising edge and ending with a falling edge. The changes in logic level on the data line BDA are not authorised during these n+m+1 synchronisation pulses (BCL=1), but only between these pulses (BCL=0). The first n=8 bits transmitted during the write cycle are data bits forming a byte to be written, transmitted by the microprocessor 10 in descending order of significance D7–D0. The following m=4 bits A3–A0 form a write address for storing the previous byte. The final bit RW, which immediately precedes the strobe pulse, indicates by the value RW=0 that the current cycle is a write cycle.

In a read cycle with addressing (FIG. 3), the strobe pulse is preceded by m+1 synchronisation pulses on the clock line BCL, m+1 bits being transmitted as previously by the microprocessor on the data line BDA. The first m=4 of these bits form a read address A3–A0 for the data required by the microprocessor. The final bit RW, which immediately precedes the strobe pulse, indicates by the value RW=1 that the current cycle is a read cycle with addressing.

After the strobe pulse in a read cycle with addressing, the microprocessor 10 still transmits n=8 synchronisation pulses on the line BCL, to which the module 16 of the peripheral unit 12 responds by presenting successively on the line BDA the n=8 bits of the read byte, in descending order of significance D7–D0. As previously, the transmission of these n data bits is operated such that transitions between these bits occur when the clock line is in the status BCL=0.

In a direct read cycle (FIG. 4), the strobe pulse is transmitted by the microprocessor at the beginning of the cycle. After this strobe pulse, the processor 10 provides ρ synchronisation pulses on the clock line BCL, to which the peripheral unit 12 responds by transmitting ρ data bits d1–d0 on the line BDA in the same way as previously (the transitions between bits occur while BCL=0).

In the example of FIG. 4, the particular case where p=2 has been shown. The p=2 bits d1–d0 are for example read from a predetermined fixed address in the registers 16 of the input/output module.

In the example of application to the telephone, the p=2 bits read in a direct read cycle may be the two bits of the status register indicating respectively the detection of ringing on the telephone line and the presence of line voltage. These two bits represent data which the microprocessor 10 may need very urgently in order to adopt an appropriate response. Thus, when it receives an interrupt request on the INT line, the microprocessor 10 may trigger a direct read cycle with a very fast run time, so as to discover the values of these two bits and to adopt the appropriate response in the shortest possible time if they do in fact show the origin of the interrupt. In the opposite case, the microprocessor 10 may then trigger a read cycle with addressing in the status register so as to discover the other status bits and to identify the origin of the interrupt.

As a numerical example (see FIG. 2), the clock frequency being 500 kHz, the length of the pulses on the clock line (BCL=1) may be T1=1 μs, and these pulses may be separated by a length T2=1 μs (BCL=0); the logic level 0 strobe pulse may have a length T3=1 μs, preceded and followed by a standby time T4=0·5 μs during which BCL=BDA=1. The length of a write or read cycle with addressing is then about 15 μs, and the length a direct read cycle with p=2 is about 4 μs. Access may be even faster when the bus is not subject to the constraints of the I$^2$C protocol, the clock frequency being able in this case to be higher.

When it is not running a transfer cycle on the bus 11/13, the microprocessor 10 keeps the clock line SDA/BDA at logic level 1.

In the I²C bus protocol 11, a falling edge on the data line SDA while the clock line SCL is at logic level 1 characterises a transfer cycle start, whereas a rising edge f on the data line SDA while BCL=1 characterises a transfer cycle end (FIG. 4). As a result, according to this I²C protocol, the data line does not change logic level more than once while the clock line is at level 1. It can therefore be seen that the transfer protocol proposed according to the invention, shown by the FIGS. 2 to 4, gives rise to no ambiguity with the I²C bus protocol used by the microprocessor 10 to control other units of the device:

- control of the SDA/BDA, SCL/BCL lines belongs to the microprocessor 10 which ensures the coexistence of the two buses:
- when the microprocessor controls the bus 13 as shown in one of FIGS. 2 to 4, no I²C transfer cycle is run on the bus 11 since the strobe pulse leads to starting and then ending an I²C cycle wherein nothing would have occurred, and the stability of the data line BDA while BCL=1 outside the strobe pulse cannot generate any I²C cycle start,
- during the run of a transfer cycle in accordance with the I²C protocol, the strobe pulse is not received by the peripheral unit 12 with the result that untimely transfers on the bus 13 are avoided.

Figure 5:
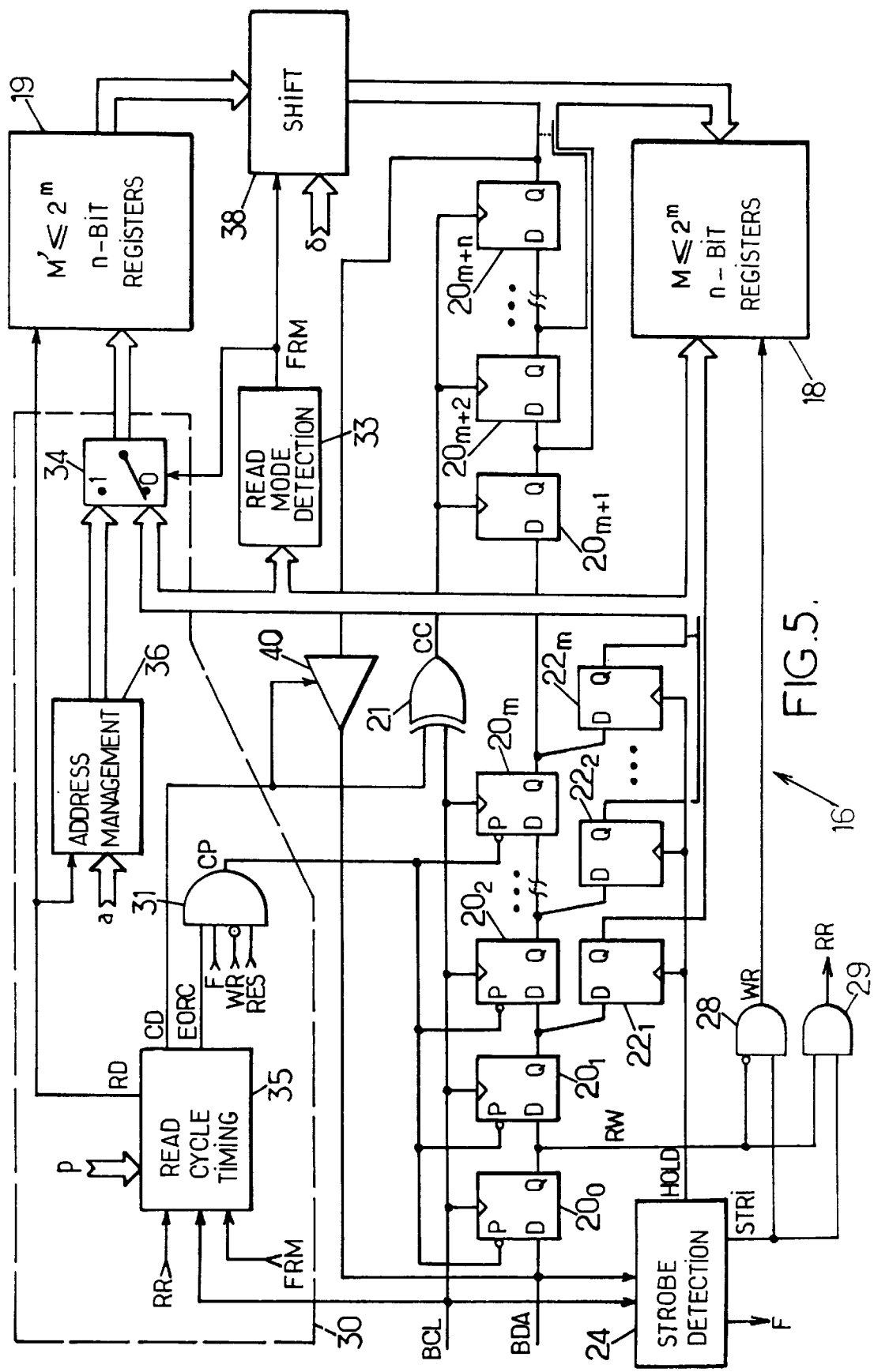
FIG. 5 is a diagram of a n example of an input/output module of an interface implementing such process.

The structure of the input/output module 16 of the peripheral unit 12 is for example in accordance with the diagram in FIG. 5. In this figure, the reference 18 denotes a group of $M \leq 2^m$ registers of n bits wherein the microprocessor 10 may control writes in cycles such as that shown in FIG. 2, the register of the group 18 where such a write occurs being selected by means of the write address A3–A0. The reference 19 denotes a group of $M' \leq 2^m$ registers of n bits wherein the microprocessor 10 may control data reads in read cycles with addressing such as that shown in FIG. 3, the register of the group 19 where such a read occurs being selected by means of the read address A3–A0. These read registers 19 include the status register used for the management of interrupts.

The module 16 includes a shift register consisting of m+1 cascaded D flip-flops $20_0$–$20_m$ timed by the rising edges of the signal present on the clock line BCL. The data input of this shift register, i.e. the D input of the first flip-flop $20_0$, is connected to the data line BDA. The module 16 includes a second shift register consisting of n cascaded D flip-flops $20_{m+1}$–$20_{m+n}$ timed by the rising edges of a signal CC delivered by an EXCLUSIVE OR gate 21. For $1 \leq i \leq m+n$, the D input of flip-flop $20_i$ is connected to the Q output of flip-flop $20_{i-1}$. The gate 21 has an input connected to the clock line BCL. Its other input receives a binary selection signal CD.

Upon reception of a strobe pulse by the peripheral unit 12 in a write or read cycle with addressing, the mode selection bit RW is present at the Q output of flip-flop $20_0$, and the m address bits A3–A0, are present at the Q outputs of flip-flops $20_1$–$20_n$.

An auxiliary register of m bits consists of m D flip-flops $22_1$–$22_m$. For $1 \leq i \leq m$, the D input of flip-flop $22_i$ is connected to the Q output of flip-flop $20_i$. The Q outputs of flip-flops $22_1$–$22_m$ supply the m address bits delivered to the group of write registers 18 and to the group of read registers 19. For this auxiliary register $22_1$–$22_m$ to receive the address A3–A0 the moment the strobe pulse is detected in a write or read cycle with addressing, the D flip-flops $22_1$–$22_m$ are timed by the rising edges of a HOLD signal delivered by a strobe detector 24.

This detector 24 (FIG. 6) includes two D flip-flops 25, 26 whose Q outputs are reset to logic level 0 at each falling edge occurring on the clock line BCL. The line BCL is connected to the D input of flip-flop 25 which is timed by the falling edges occurring on the data line BDA, and whose Q output delivers the aforementioned HOLD signal. This signal is on the one hand addressed to the D input of flip-flop 26 timed by the rising edges occurring on the data line BDA, and whose Q output delivers a detection signal STRI. This STRI signal has a logic level 1 pulse which starts at the end of each strobe pulse and ends when the BCL line returns to 0.

An AND gate 28 combines the STRI signal with the logic complement of the RW bit obtained on the Q output of flip-flop $20_0$ to produce the write control signal WR addressed to the group of write registers 18. This signal WR (FIG. 2) controls the parallel transfer of the n bits D7–D0 present on the Q outputs of flip-flops $20_{m+1}$–$20_{m+n}$ in the register of the group 18 whose location is denoted by the m address bits A3–A0 obtained on the Q outputs of flip-flops $22_1$–$22_m$.

Another AND gate 29 receives the signal STRI and the selection bit RW obtained on the Q output of flip-flop $20_0$ to produce a signal RR having a similar behavior in the read cycles (FIGS. 3 and 4).

In order to distinguish read cycles with addressing from direct read cycles, provision is made for one value of the read address to be excluded by the microprocessor 10 for the read cycles with addressing. As an example, this may be the value for which all the address bits are at 1.

The flip-flops of the first shift register $20_0$–$20_m$ each have a preselection input P acting to force their Q output to logic level 1 upon each falling edge of a pre-selection signal CP. This signal CP is supplied by a filter formed by an AND gate 31 belonging to read cycle managing means 30. The AND gate 31 combines the following signals:

- a general reset signal RES for the unit 12;
- the logical complement of the write control signal WR, whose rising edge, occurring at the end of a write cycle (FIG. 2), thus causes the writing of the excluded address in flip-flops $20_1$–$20_m$ of the first shift register, and of RW=1 in flip-flop $20_0$;
- an end of read cycle signal EORC, which has a logic level 0 pulse at the end of each read cycle (FIGS. 3 and 4), to write RW=1 as well as the excluded address in the register $20_0$–$20_m$ at the end of each read cycle, direct or with addressing; and
- a false strobe detection signal F, which locates logic level changes on the data line BDA occurring while BCL=1 and which cannot be attributed to a strobe pulse.

Figure 6:
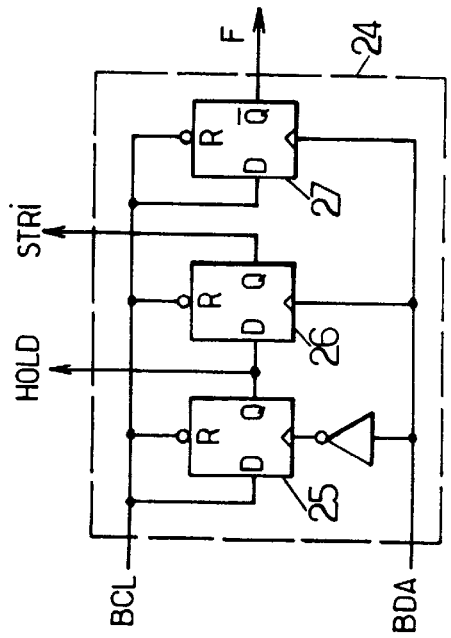
FIG. 6 is a diagram giving details of an embodiment of a strobe detector of the module in FIG. 5.

The signal F acts to force the writing of RW=1 and of the excluded address value in the register $20_0$–$20_m$ at the end of the transfer cycles controlled by the microprocessor 10 in accordance with the I²C protocol. This signal F has a falling edge at the end of each I²C transfer cycle, as is shown in the left hand part of FIG. 4. This signal F is for example supplied by the inverted output $\overline{Q}$ of a D flip-flop 27 of the strobe detector 24 (FIG. 6). This flip-flop 27 is reset to 0 at each falling edge occurring on the clock line BCL. The line BCL is connected to the D input of flip-flop 27 which is timed by the rising edges occurring on the data line BDA.

The shaping of the pre-selection signal CP is such that the microprocessor 10 can decide at each moment to run a direct read cycle.

To identify the nature of the current transfer cycle, the AND gates 28, 29 are completed by a detection logic 33 connected to the Q outputs of the flip-flops of the auxiliary register $22_1$–$22_m$ This detection logic 33, which simply consists of an AND gate with m inputs when the excluded address value is 11 . . . 1, delivers a selection bit FRM which is at 1 when the excluded address is detected and at 0 otherwise.

The read cycle managing means 30 further include an address switch 34 controlled by the FRM bit, a timing module 35 and an address management module 36. The module 35 delivers the read control signal RD supplied to the group of registers 19. This signal RD is produced in response to the pulse from the signal RR delivered by the AND gate 29, and corresponds to that pulse prolonged during a clock cycle BCL, as FIGS. 3 and 4 show.

A three-state gate 40 forms an output switch of the input/output module 16, with its input connected to the Q output of the last flip-flop $20_{m+n}$ of the second shift register, and its output connected to the data line BDA. This three-state gate 40 may be controlled by the binary selection signal CD which is supplied to the EXCLUSIVE OR gate 21, so as to be in the off (open) state when CD=0 and in the on (closed) state when CD=1.

The signal CD is delivered by the timing module 35. It remains at level 0 outside transfer cycles on the bus 13 as well as during write cycles. During a read cycle (FIGS. 3 and 4), the signal CD remains at level 0 until the strobe pulse is detected. When it senses a rising edge on the output RR of the gate 29, the module 35 generates a rising edge of the signal CD which is then held at 1 until the end of the following synchronisation pulses on the clock line BCL. The module 35 therefore holds the signal CD at 1 until it has received n synchronisation pulses on the line BCL when FRM=0, and until it has received p synchronisation pulses when FRM=1. The level 0 pulse of the end of cycle signal EORC is produced when the signal CD returns to 0 (FIGS. 3 and 4).

When FRM=0, the switch 34 is in the position shown in FIG. 5, so that a pulse of the RD signal causes the reading of a byte in the group 19 at the address present in the auxiliary register $22_1$–$22_m$. The circular shift module 38 to which the bits of the byte read in the group 19 are supplied is deactivated when FRM=0, which enables the parallel transfer of these bits to the shift register $20_{m+1}$–$20_{m+n}$ The most significant bit in the byte is supplied first on the data line BDA via the gate 40, whereas the other bits of the byte are loaded in the flip-flops $20_{m+2}$–$20_{m+n}$ of the second shift register. These other bits are then delivered in series on the data line BDA in response to the following synchronisation pulses of the clock BCL. The inversion of this clock by the exclusive OR gate 21 enables data stability to be ensured in time intervals when BCL=1.

In a direct read cycle, the switch 34 is positioned to obtain the read address a from the address management module 36. When this address a is fixed, the module 36 is reduced to connections supplying the constant value a to the switch 34. If the ρ bits read in a direct read cycle are always the most significant ρ bits of one of the group 19 registers, the shift module 38 is useless. Otherwise, it is activated by the FRM=1 bit so as to introduce the required shift, of δ bits, to deliver the required bits to the data line BDA.

It is possible to choose, for the number of bits to be transferred in a direct read cycle, a number ρ greater than the size n of the group 19 registers. The operation is then the same as that described previously, except that the timing module 35 has to reactivate the read control signal RD every n synchronisation pulses thus causing the incrementation of the address supplied by the module 36 (essentially consisting of a counter), and the parallel transfer to the shift register $20_{m+1}$–$20_{m+n}$ of the content of a new register of the group 19 pointed to by the incremented address.

The parameters ρ (number of bits transferred in a direct read cycle), a (start address) and δ (possible shift) may be fixed, as in the previously described example. They may also be parameters which can be programmed by the microprocessor 10. In this case, the modules 35, 36 and 38, which use parameters ρ, a and δ respectively, obtain them from one of the write registers of the group 18. To modify one or other of these parameters, the microprocessor 10 may simply run a write cycle in the register or registers in question, the addresses of which it knows.

Figure 7:
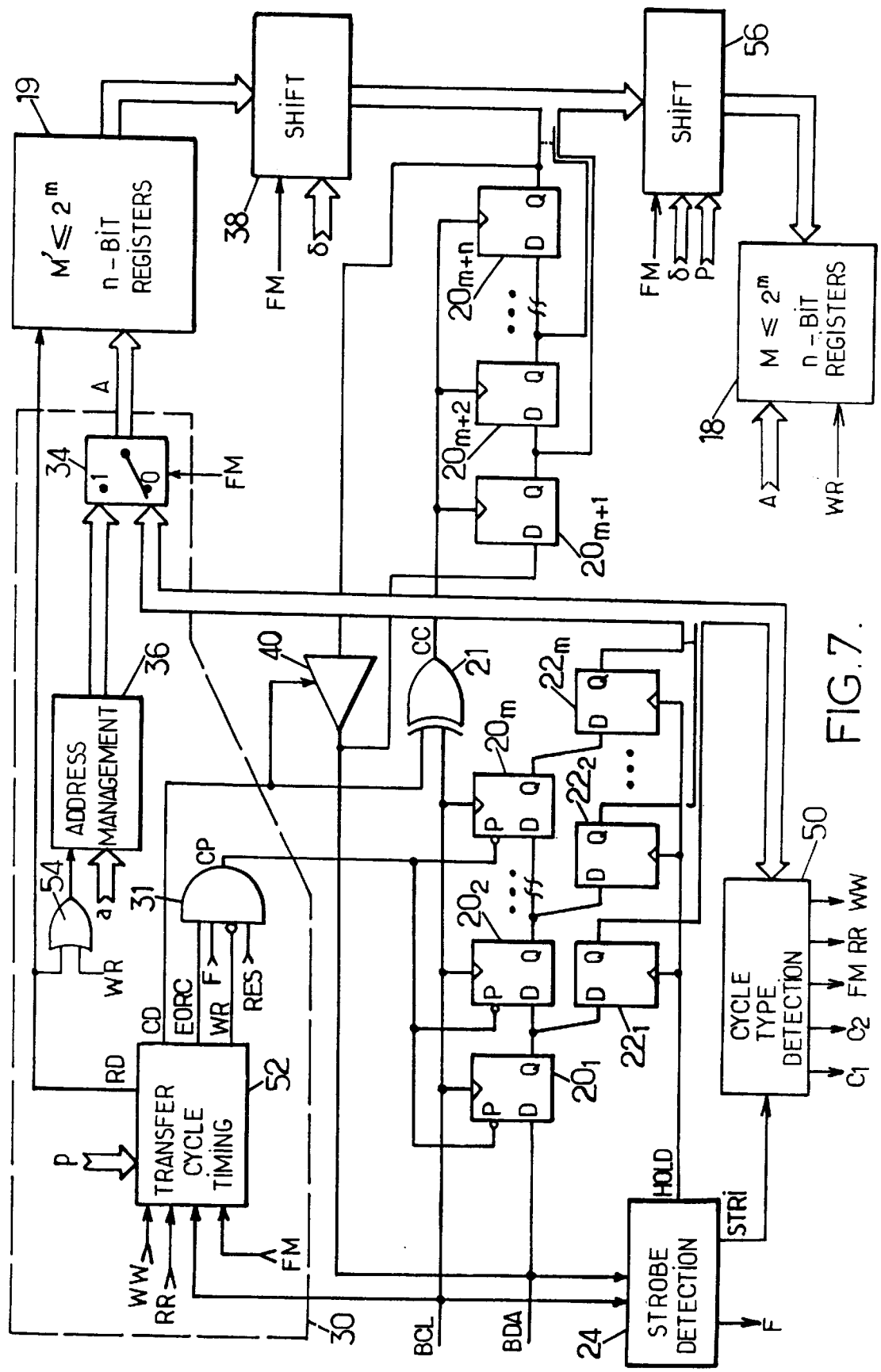
FIG. 7 is a diagram of another example of an input/output module of an interface in accordance with the invention.

In the alternative embodiment shown in FIG. 7, the direct transfer cycles, without addressing, are not limited to read cycles. Direct write cycles are also possible. In addition, in that embodiment, the mode selection bit RW is not transmitted by the microprocessor. The distinction between the read and write cycles is carried out on the basis of a decoding of the addresses present in the auxiliary register $22_1$–$22_m$ upon the detection of the strobe pulse.

The input-output module shown in FIG. 7 has numerous elements in common with that of FIG. 5, which are designated by the same reference numerals. The first shift register whose input is connected to the data line BDA of the bus 13 lacks one flip-flop since the RW bit no more needs to be taken into account. The flip-flops $20_1$–$20_m$ remain and are coupled in the same way to the flip-flops $22_1$–$22_m$ of the auxiliary register.

The parallel m-bit output of the auxiliary register is connected to a cycle type detection logic 50, which also receives the STRI signal output by the strobe detector 24. Logic 50 performs a decoding of the addresses contained in the auxiliary register $22_1$–$22_m$ when it receives a pulse of the STRI signal. This decoding is in accordance with predefined rules. By way of non-restrictive example, those rules may consist in that (i) the addresses having the form 1xx . . . x (where each x is 0 or 1) are used by the microprocessor in read cycles with addressing, (ii) the addresses having performed 0xx . . . x are used in the write cycles with addressing, (iii) the address 111 . . . 1 is an excluded read address, whose presence in the auxiliary register $22_1$–$22_m$ characterises a direct to read cycle, and (iv) the address 011 . . . 1 is an excluded write address whose presence in the register $22_1$–$22_m$ characterises a direct write cycle. In this particular case, there are as many read-addressable locations as write-addressable locations. A decoding table (possibly programmable by the microprocessor 10) in logic 50 more generally permits any combination of memory areas accessible in read and/or write cycles.

Figure 8:
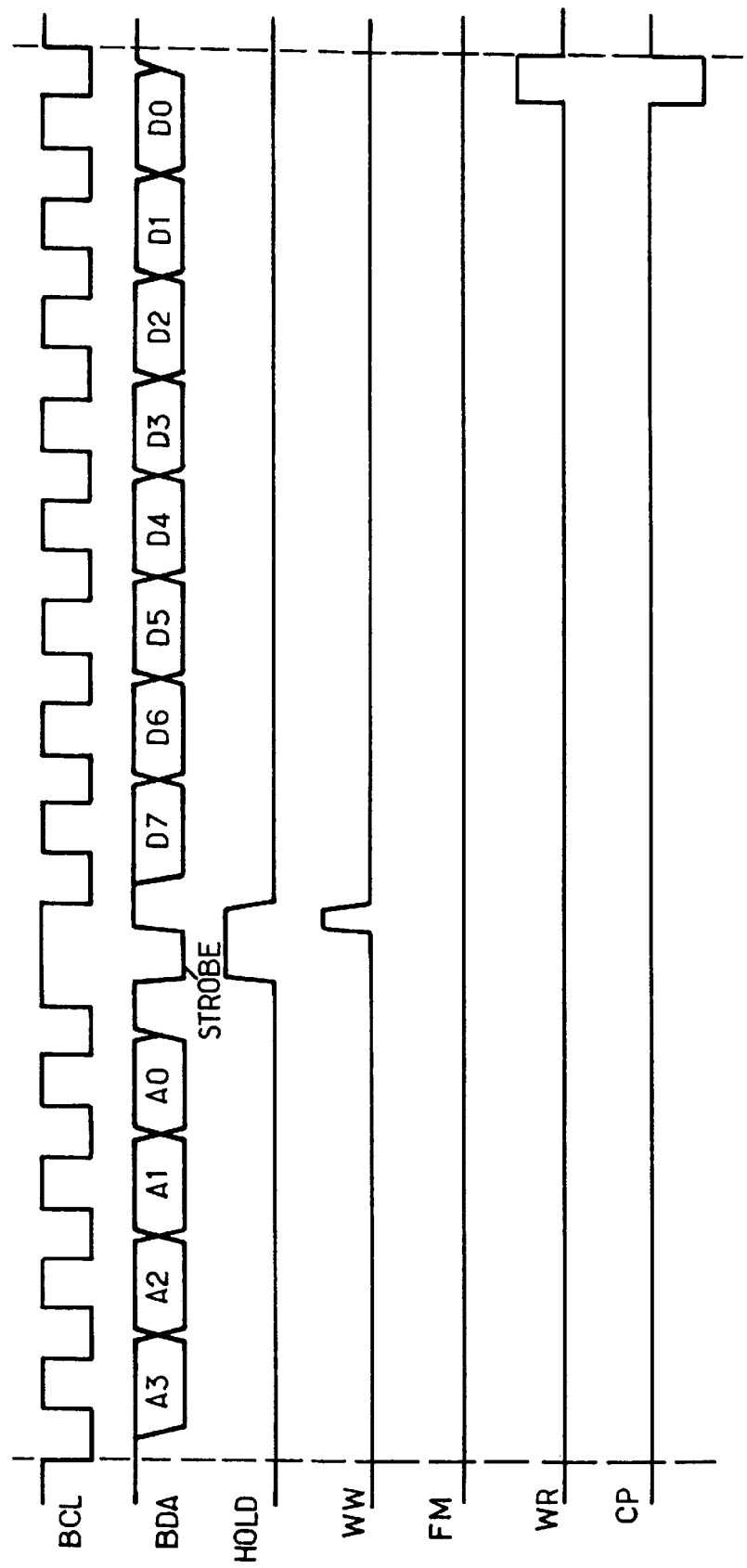
Figure 9:
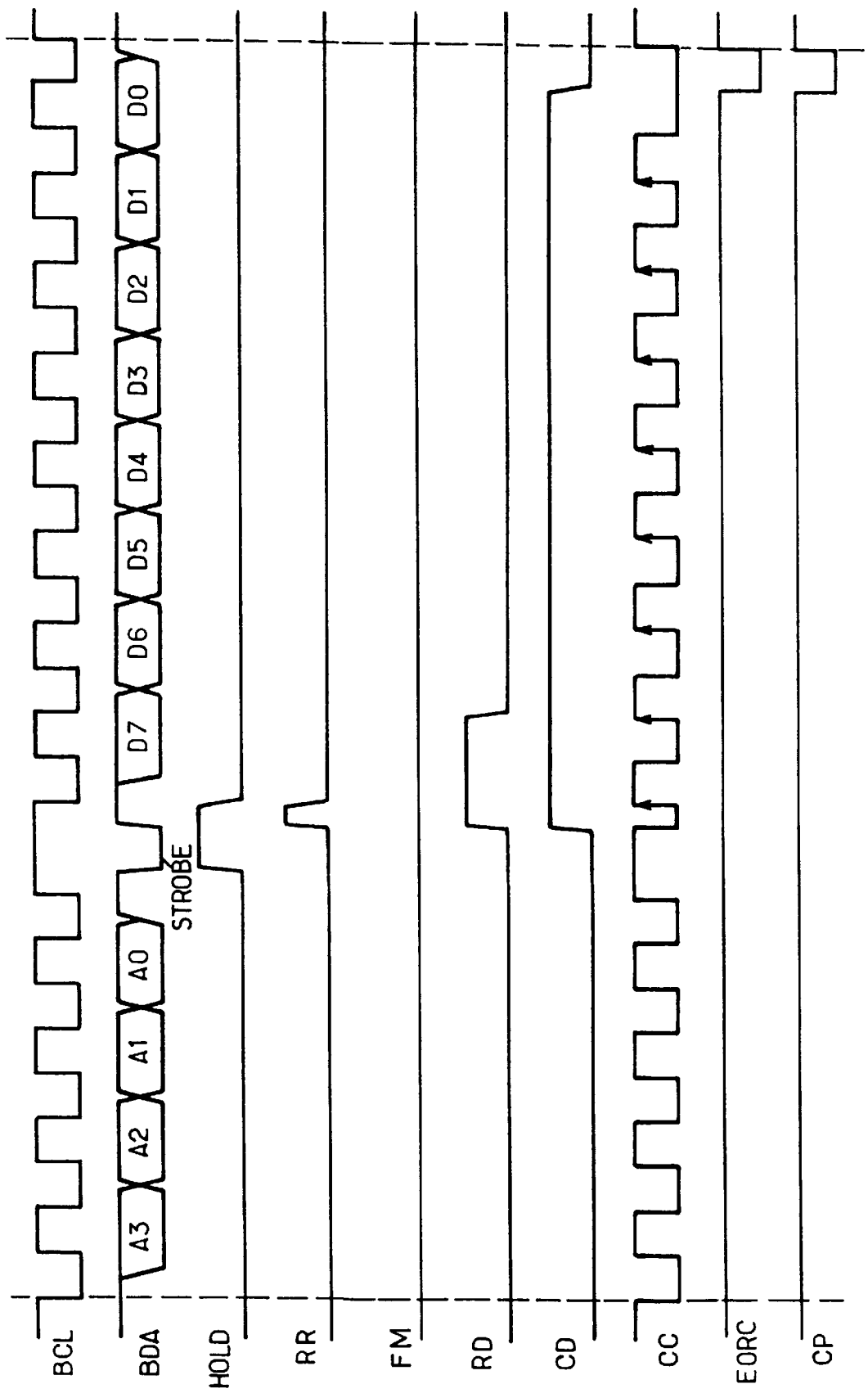

Upon detection of a read cycle (direct or with addressing), the logic 50 produces a logic level 1 pulse in the RR signal whose role is the same as that described in the preceding embodiment (see FIGS. 9 and 10). Upon detection of a write cycle (direct or with addressing), the logic 50 likewise produces a logic level 1 pulse in the WW signal, as indicated in FIGS. 8 and 11. In each direct transfer cycle, the logic 50 further activates a signal FM, whose role is similar to that of the FRM signal in the preceding embodiment (in particular, it controls the address switch 34 which delivers the read or write address A, and possibly the shift module 38).

As illustrated in FIG. 7, the detection logic 50 could further produce control signals C1,C2, . . . responsive to the detection of certain particular addresses in the auxiliary register $22_1$–$22_m$. This type of decoding offers the possibility to transmit controls to certain elements of the peripheral unit 12 without having to explicitly transfer data on the line BDA.

The signals FM, RR and WW output by the detection logic 50 are supplied to a transfer timing module 52 forming part of the transfer cycle management means 30, and playing a role similar to that of module 35 described with reference to FIG. 5. This module 52 produces the read control signal RD and write control signal WR supplied to the register arrays 19,18. The production of the signals RD, CD and EORC by module 52 is identical to that previously described (FIGS. 9 and 10).

The production of the write control signal WR takes into account the fact that, in the considered alternative embodiment, the written data D7–D0 or d1–d0 are transmitted on the data line BDA by the microprocessor 10 after the strobe pulse. In a write cycle with addressing (FM=0), the module 52 thus delays by n cycles of the clock BCL the activation of the WR signal (FIG. 8). In the case of a direct write cycle, this delay is of $\rho$ cycles of the clock BCL (FIG. 11).

In order to allow for the loading of the data bits to be written into the second register $20_{m+1}$–$20_{m+n}$, the serial input of that register, consisting of the D input of flip-flop $20_{m+1}$ is directly connected to the data line BDA, as shown in FIG. 7. In another alternative embodiment, the D input of flip-flop $20_{m+1}$ could be connected either to the Q output of flip-flop $20_m$ or to the data line BDA depending on the position of a switch. This switch could for instance be controlled by a control bit C1 or C2 output by the detection logic 50 in response to a coded command from the microprocessor 10, thereby enabling the processor 10 to dynamically decide whether it transmits the data before or after the strobe pulse in the write cycles.

As shown in FIG. 11 in the particular case considered hereabove for the coding of the addresses, the microprocessor 10 provides a bit at0 on the data line BDA at the same time as it produces a clock cycle on the line BCL immediately before transmitting the strobe pulse in the direct write cycles. This allows for the loading of a bit 0 in the flip-flops $20_i$ and $22_1$, so as to change the default address 111 . . . 1 characterising the direct read cycles into the address 011 . . . 1 characterising the direct write cycles, whereby the detection logic 50 can then perform the suitable decoding.

If the number $\rho$ of bits concerned by a direct transfer (read or write) cycle is greater than the size n of a register of the arrays 18,19, the control signal RD or WR is periodically reactivated as in the preceding example, and the address counter 36 is incremented by the output of an OR gate 54 receiving the signals RD and WR. The microprocessor may thus have access to several registers during the same direct transfer cycle.

Provision may also be made for a shift $\delta$ in the position of the bits concerned by a direct write cycle. For this, a circular shift module 56, controlled by the FM bit in the same manner as module 38, is provided between the register $20_{m+1}$–$20_{m+n}$ and the write register array 18.This module 56 also receives the number $\rho$ of bits concerned by the direct write cycle, so as to inhibit the write operation in the non-concerned locations of the addressed register.

I claim:

1. A process for serial data transfer between a main processing unit and a peripheral unit connected to each other by a bus including a data line and a clock line,
   wherein the main processing unit controls synchronised transfer cycles by means of the clock line, including transfer cycles with addressing and direct transfer cycles,
   wherein, during each cycle, the main processing unit transmits on the data line a strobe pulse while the clock line is at a first logic level,
   wherein, before transmitting the strobe pulse in a transfer cycle with addressing, the main processing unit transmits on the data line bits of a transfer address, with corresponding synchronisation pulses on the clock line,
   wherein, after receiving the strobe pulse in a transfer cycle with addressing, the peripheral unit accesses to a memory location determined from the transfer address to write or read data bits successively presented on the data line synchronously with corresponding synchronisation pulses on the clock line,
   and wherein, after receiving the strobe pulse in a direct transfer cycle, the peripheral unit accesses to a memory location determined prior to said direct transfer cycle to write or read data bits successively presented on the data line synchronously with corresponding synchronisation pulses on the clock line.

2. A process in accordance with claim 1, wherein, in a direct transfer cycle, the main processing unit transmits the strobe pulse at the beginning of the cycle.

3. A process in accordance with claim 2, wherein, before transmitting the strobe pulse in a transfer cycle with addressing, the main processing unit transmits on the data line a mode selection bit having a first value if said transfer cycle with addressing is a write cycle, and a second value, complementary to the first value, if said transfer cycle with addressing is a read cycle.

4. A process in accordance with claim 3, wherein the data line is connected to a serial data input of a shift register of the peripheral unit timed by the clock line, said shift register having a sufficient size to contain the address bits and the mode selection bit transmitted in a transfer cycle with addressing, wherein at least one address value is excluded for the transfer addresses transmitted by the main processing unit in the read cycles with addressing, and wherein, when detecting a strobe pulse, the peripheral unit examines the content of said shift register to determine whether the detected strobe pulse is part of a write cycle with addressing, of a read cycle with addressing or of a direct read cycle, a direct read cycle being selected if the shift register contains the excluded address value and a mode selection bit having said second value.

5. A process in accordance with claim 4, wherein the main processing unit holds the clock line at the first logic level when not running a transfer cycle, and wherein the main processing unit and the peripheral unit transmit the data, address and mode selection bits in said transfer cycles in such a way that transitions between said bits occur while the clock line is at a second logic level complementary to the first logic level.

6. A process in accordance with claim 5, wherein while the clock line is at the first logic level, the peripheral unit examines the data line to detect logic level changes which cannot be attributed to a strobe pulse, and to write the excluded address value and a mode selection bit having said second value in the shift register in response to such detection.

7. A process in accordance with claim 6, wherein the clock line and the data line are used by the main processing unit to exchange data with other units in accordance with a protocol wherein the data line does not change logic level more than once while the clock line is at the first logic level.

8. A process in accordance with claim 1, comprising the step of decoding the bits of the transfer address received by the peripheral unit in a transfer cycle with addressing, in order to determine whether said transfer cycle with addressing is a write cycle or a read cycle.

9. A process in accordance with claim 8 wherein the data line is connected to a serial data input of a shift register of the peripheral unit timed by the clock line and of sufficient size to contain the address bits transmitted in a transfer cycle with addressing, wherein at least one address value is excluded for the transfer addresses transmitted by the main processing unit in the transfer cycles with addressing, and wherein, when detecting a strobe pulse, the peripheral unit examines the content of said shift register to determine whether the detected strobe pulse is part of a transfer cycle with addressing or of a direct transfer cycle, a direct transfer cycle being selected if the shift register contains an excluded address value.

10. A process in accordance with claim 9, wherein the direct transfer cycles comprise direct write cycles and direct read cycles, respectively selected when the shift register contains first and second excluded address values, which differ from each other only by a bit located in an input location of the shift register.

11. A process in accordance with claim 10, wherein the main processing unit holds the clock line at the first logic level when not running a transfer cycle, and wherein the main processing unit and the peripheral unit transmit the data and transfer address bits in said transfer cycles in such a way that transitions between said bits occur while the clock line is at a second logic level complementary to the first logic level.

12. A process in accordance with claim 11, wherein while the clock line is at the first logic level, the peripheral unit examines the data line to detect logic level changes which cannot be attributed to a strobe pulse, and to write in the shift register, in response to such detection, a default address value corresponding to one of the first and second excluded address values.

13. A process in accordance with claim 12, wherein, in a direct transfer cycle of the type selected when the shift register contains the default address value, the main processing unit transmits the strobe pulse at the beginning of the cycle, and wherein, in a direct transfer cycle of the type selected when the shift register contains the one of the first and second excluded address values which does not correspond to the default address value, the main processing unit transmits the strobe pulse immediately after the transmission, at the beginning of the cycle, of a bit modifying the one located in the input location of the shift register.

14. A process in accordance with claim 12, wherein the clock line and the data line are used by the main processing unit to exchange data with other units in accordance with a protocol wherein the data line does not change logic level more than once while the clock line is at the first logic level.

15. A process in accordance with claim 1, wherein the location where the data bits are read or written in a direct transfer cycle is a fixed location.

16. A process in accordance with claim 1, wherein the location where the data bits are read or written in a direct transfer cycle is determined from data transmitted by the main processing unit during a previous write cycle.

17. A process in accordance with claim 16, wherein the number of data bits transmitted successively in a direct transfer cycle is determined from data transmitted by the main processing unit during a previous write cycle.

18. A process in accordance with claim 1, wherein the bus further includes an interrupt line on which the peripheral unit sends an interrupt request to the main processing unit when it detects an event among a group of specified events, the peripheral unit comprising a status register to contain bits indicating respectively the events of said group which have been detected, and wherein, when it receives a request on the interrupt line, the main processing unit controls the following transfer cycles:

a direct read cycle to read a specified portion of the status register; and if the bits contained in said portion of the status register do not indicate an event detection, at least one read cycle with addressing to read the rest of the status register.

19. A process in accordance with claim 1, wherein the direct transfer cycles comprise transfer cycles for commands from the main processing unit to the peripheral unit.

20. A synchronous serial bus interface for a peripheral unit controlled by a main processing unit by means of a bus including a data line and a clock line including:

strobe pulse detection means, to detect strobe pulses occurring on the data line of the bus, while the clock line of the bus is at a first logic level;

a first shift register timed by the clock line of the bus, having a serial data input and a serial data output, wherein the serial data input of the first shift register is connected to the data line;

an EXCLUSIVE OR gate having an input connected to the clock line of the bus, another input receiving a binary selection signal and an output;

a second shift register timed by the output of the EXCLUSIVE OR gate, having a serial data input and a serial data output, wherein the serial data input of the second shift register is connected to the serial data output of the first shift register or to the data line;

an output switch connected on the one hand to the serial data output of the second shift register and on the other hand to the data line of the bus;

transfer cycle identification means in order to analyse the content of the first shift register when a strobe pulse is detected by the strobe pulse detection means, so as to identify each transfer cycle to which a detected strobe pulse belongs;

write registers addressable from a write address obtained from the first shift register when a write cycle with addressing has been identified, a write cycle with addressing wherein the binary selection signal is held at 0, the output switch is kept open and the detection of the strobe pulse is followed by the parallel transfer of the content of the second shift register into the write register denoted by the write address;

read registers addressable from a read address when a read cycle has been identified, a read cycle wherein the detection of the strobe pulse is followed by the parallel transfer of at least part of the content of the read register denoted by the read address into the second shift register and by the serial transfer of the content of the second shift register to the output switch, a serial transfer during which the binary selection signal is set at 1 and the output switch is closed; and transfer cycle managing means to obtain the read address from the first shift register when a read cycle with addressing has been identified, and to supply a previously specified read address when a direct read cycle has been identified.

21. A synchronous serial bus interface in accordance with claim 20, wherein the read address supplied by the read cycle managing means in a direct read cycle is a fixed address.

22. A synchronous serial bus interface in accordance with claim 20, wherein the read address supplied by the read cycle managing means in a direct read cycle is obtained from the content of one of the write registers.

23. A synchronous serial bus interface in accordance with claim 22, wherein the number of bits transferred to the output switch in a direct read cycle is obtained from the content of one of the write registers.

24. A synchronous serial bus interface in accordance with claim 20, wherein at least one address value is excluded in the read cycles with addressing, and wherein the transfer cycle identification means examine the content of the first shift register when a strobe pulse has been detected so as to identify a direct read cycle if the first shift register contains the excluded address.

25. A synchronous serial bus interface in accordance with claim 24, wherein the synchronisation of the transfers by the main processing unit is such that transitions between the transmitted bits occur while the clock line is at a second logic level complementary to the first logic level, and that the clock line is held at the first logic level when no transfer cycle is run, and wherein filtering means are provided to write the excluded address value in the first shift register in response to logic level changes which cannot be attributed to a strobe pulse, occurring on the data line while the clock line is at the first logic level.

26. A synchronous serial bus interface in accordance with claim 25, wherein the filtering means are further arranged to write the excluded address value in the first shift register at the end of each write cycle.

27. A synchronous serial bus interface in accordance with claims 20, wherein the write registers are further addressable from a previously specified write address when a direct write cycle has been identified, a direct write cycle wherein the binary selection signal is held at 0, the output switch is kept open and the detection of the strobe pulse is followed by the parallel transfer of the content of the second shift register into the write register denoted by the write address.

* * * * *

UNITED STATES PATENT AND TRADEMARK OFFICE
CERTIFICATE OF CORRECTION

PATENT NO. : 6,182,175 B1
DATED : January 30, 2001
INVENTOR(S) : Gilbert Nihouarn It is certified that error appears in the above-identified patent and that said Letters Patent is hereby corrected as shown below:

Title Page,
In (12) and (75) delete "Nihouran" and insert therefore --Nihouarn--.

Signed and Sealed this

Ninth Day of October, 2001

Attest:

NICHOLAS P. GODICI
Attesting Officer  *Acting Director of the United States Patent and Trademark Office*